June 16, 1936.  J. W. BAGLEY  2,044,114
PLOTTING MACHINE AND PROCESS OF MAKING MAPS WITH AERIAL PHOTOGRAPHS
Filed July 11, 1934    4 Sheets—Sheet 4

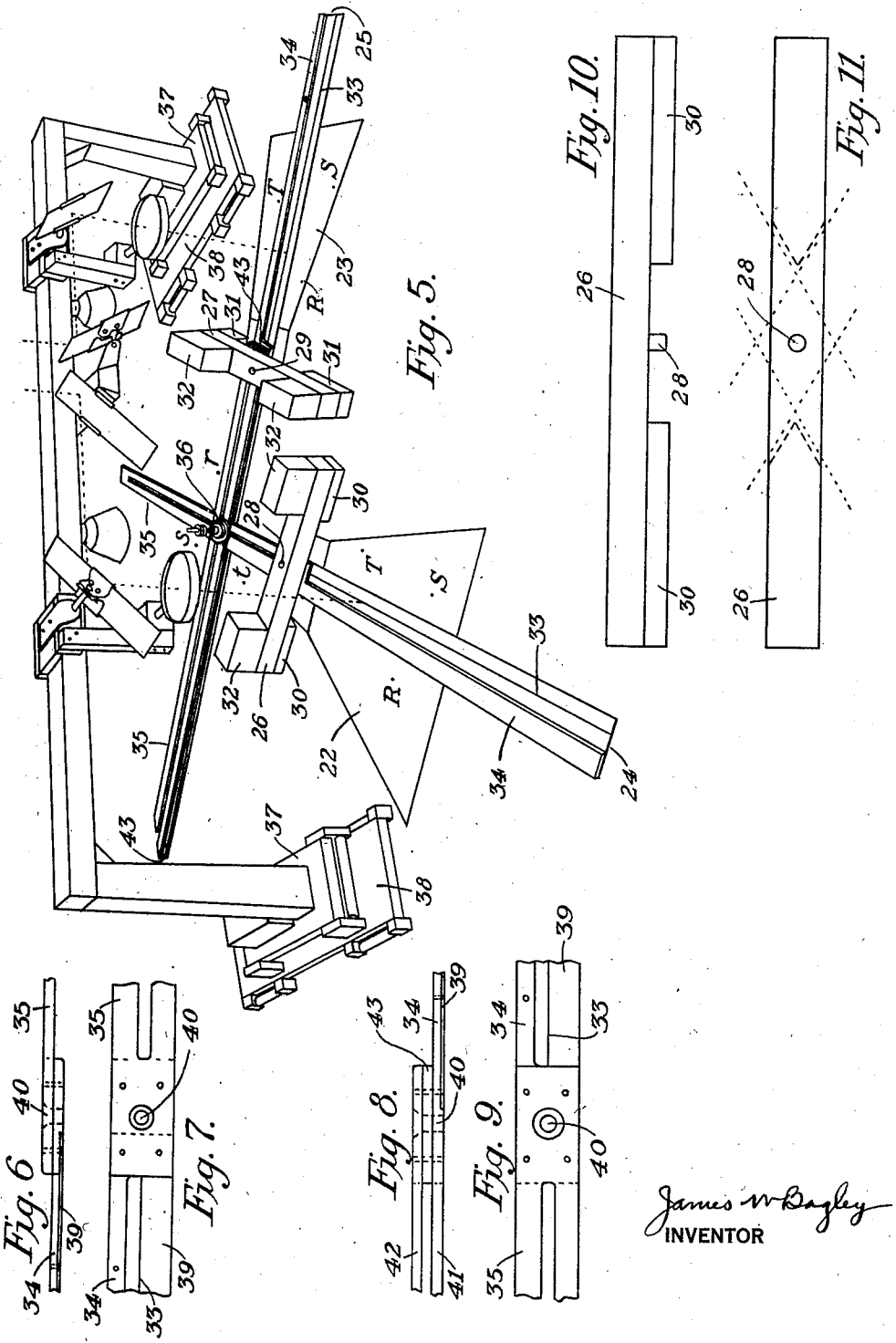

James W Bagley
INVENTOR

Patented June 16, 1936

2,044,114

UNITED STATES PATENT OFFICE 2,044,114

PLOTTING MACHINE AND PROCESS OF MAKING MAPS WITH AERIAL PHOTOGRAPHS

James Warren Bagley, Fayetteville, Tenn.

Application July 11, 1934, Serial No. 734,686

7 Claims. (Cl. 33—20)

My invention relates in general to a process of making maps with aerial photographs and more particularly to a plotting machine, a specially mounted stereoscope and an arrangement of aerial photographs for direct plotting of maps from the photographs with the plotting machine and the stereoscope.

An important feature of the process is the placing of parts of two or more photographs covering the same terrain on a prepared plotting sheet with each center point resting exactly over its plotted position and, using this point as pivot, rotating the photograph in the plane of the plotting sheet exactly 180 degrees from its righted position. Each photograph part is thus set into position, its reverse orientation being accomplished by bringing the central point, the plotted position of a control point on the map sheet and the image on the photograph of the said control point all three into line with a straight edge.

In some cases it will be convenient to employ as the pivot point, instead of the center point of the photograph, a point of an object whose image is close to the center; for such a point can usually be quickly identified on other photographs which embrace that terrain. Also when the relief of the terrain is great and the tilt of a photograph moderate, more accurate results will be obtained by using the vertical point of the photograph as the pivot. The vertical point is defined as that point where a plumb line through the center of the camera lens at the instant of exposure would strike the photograph. In instances where the tilt of the photograph is considerable and the relief of the terrain is moderate, it will be advantageous to employ the center of distortion of the photograph as the pivot point for plotting. The center of distortion is defined as that point of a tilted photograph about which all distortions due to tilt of the camera radiate. On "vertical" photographs commonly employed for making maps it lies, near enough for practical mapping purposes, midway between the center of the photograph and the vertical point.

The photograph parts thus having been placed and oriented on the map sheet, the machine is set in place over them, each pivot of its arms coinciding with the center point of one of the photographs. A well-defined and plainly visible straight line on each arm then serves for setting the arms accurately into position over any object to be located, the said straight line on each arm being a prolongation of the center line of a longitudinal slot lying on the opposite side of the pivot. When each line of an arm cuts an image of the same object pictured by two or more photographs the true location of the object is found at the intersection of the center lines of the longitudinal slots, on an uncovered part of the map sheet where it may be "pointed" with a needle or marked by a pencil. It will be shown in one of the accompanying drawings how a pencil may be made to move as the arms are moved and with the aid of a specially rigged simple stereoscope an operator may cause the pencil correctly to draw on the map sheet details common to a pair of photographs, by moving the arms of the machine in unison, so that each arm-line continually cuts a corresponding part of an image of the same object. In this manner such features as roads, streams and shores, which appear as lines on the photographs, may be drawn readily as a continuous operation. The machine can be utilized with overlapping photographs taken with single-lens or other types of aerial cameras, provided the photographs be taken to give favorable overlap. It will be evident from this specification that though this invention may be most useful when employed with a pair of photographs the principles of the process and of the machine permit the employment simultaneously of three or more photographs which cover the same terrain, an arm being provided for each photograph.

Fig. 5 shows diagrammatically and in perspective the plotting machine set in place over a pair of overlapping photographs which have been properly placed and oriented on a map sheet by rotating them 180 degrees. It also shows a method of rigging a simple adjustable stereoscope for use with the machine. The photographs shown in outline consist each of one outer elemental part of a five-lens aerial camera photograph with its center point.

Fig. 6 is an enlarged side elevation view of the central part of the left arm of the plotting machine and Fig. 7 is a plan view of the same part.

Fig. 8 is an enlarged side elevation view of the central part of the right arm of the plotting machine and Fig. 9 is a plan view of the same part.

Fig. 10 is an enlarged side elevation view of one of the pivot bars of the plotting machine and Fig. 11 is a plan view of the same pivot bar.

Figure 12:
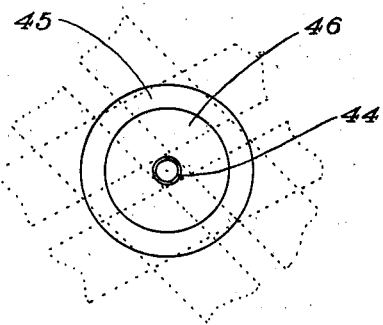

Fig. 12 is an enlarged plan view of the pencil carriage and its weight. Parts of the two slotted beams are indicated by dotted lines.

Figure 13:
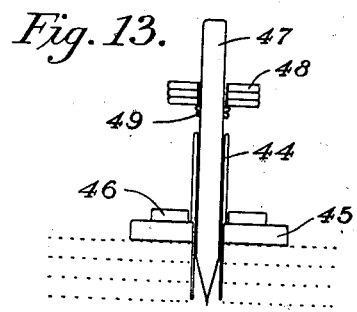

Fig. 13 is a vertical outline of the pencil, its weights, the weight stop, the pencil carriage and its weight. Parts of the two slotted beams are indicated by dotted lines.

Figure 14:
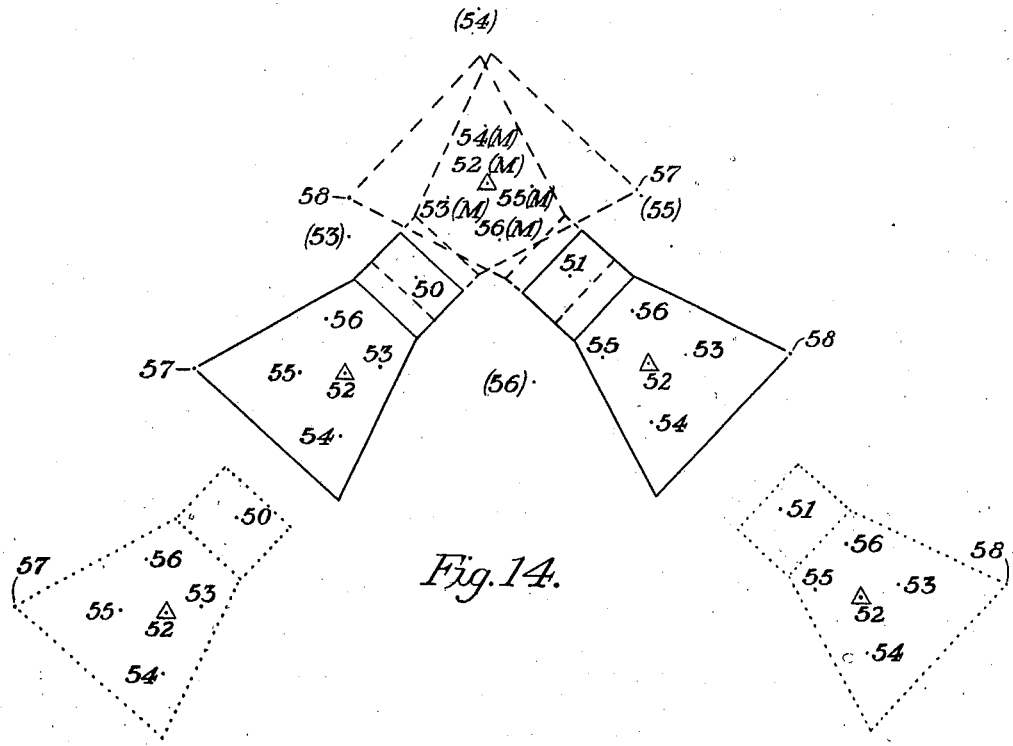

Fig. 14 shows in plan the outlines of elemental parts of two overlapping five-lens camera photographs as they are related to a map sheet and to each other and the setting of them on the map sheet for use with the plotting machine. It also shows how the scale of the map to be drawn from the photographs may be varied by shifting the positions of the photographs.

Figure 1:
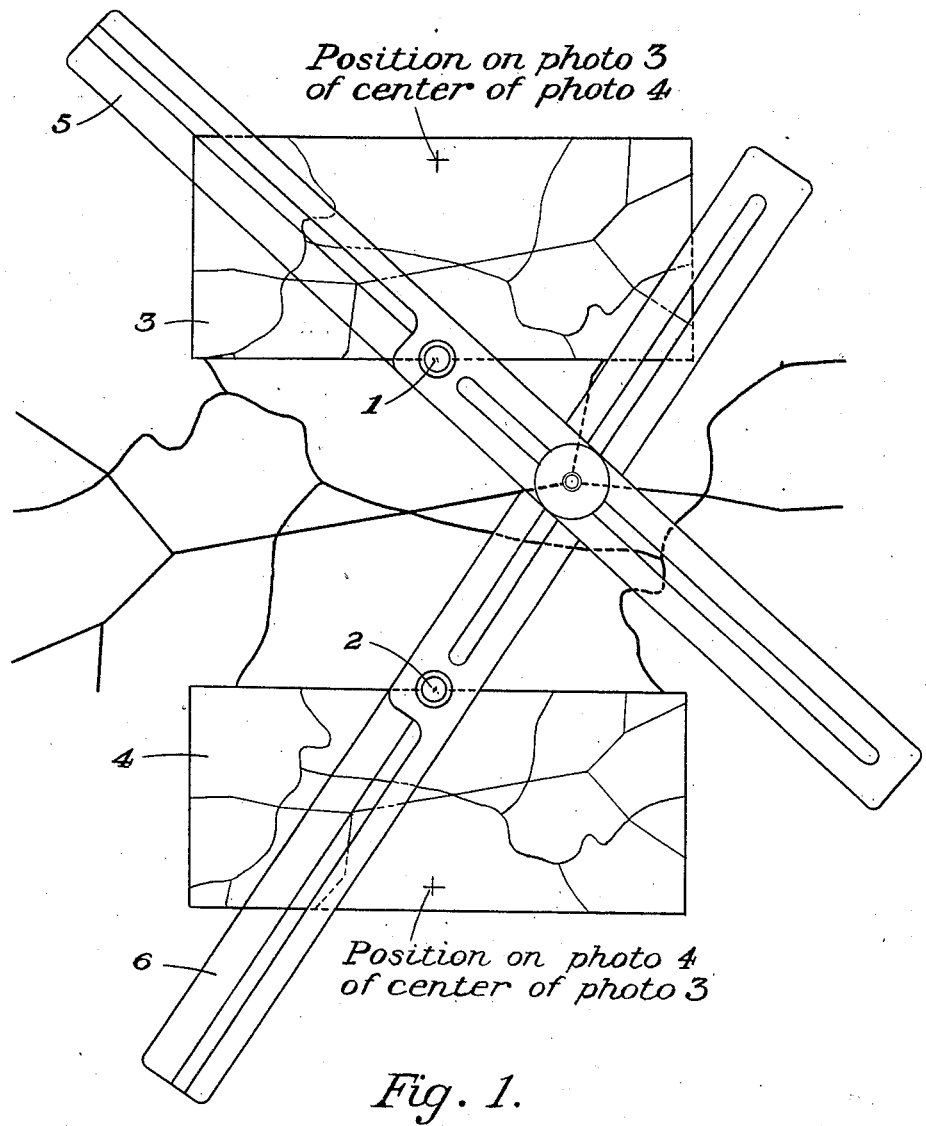
Fig. 1 shows diagrammatically parts of two single-lens aerial photographs which cover the same terrain, as is commonly the case in mapping when photographs are taken to overlap about 60 per cent, and the arms of a two-arm plotting machine placed on a plotting sheet. The photographs have been cut through their center points and only the halves which embrace common terrain are shown.

Referring to the drawings:

In Fig. 1 the plotting sheet rests on a flat table or drafting board. The sheet is the field on which the photographs and plotting arms rest. On it have been plotted the positions of the center points 1 and 2 of the two photographs 3 and 4. Inasmuch as the overlap is 60 per cent, each photograph includes the center of the other photograph and the located positions of the two center points ordinarily are sufficient to place and orient the photographs. By using half photographs which cover common terrain the placement and orientation of the photographs may be accomplished readily and the plotting sheet left exposed where required. The plotting arms 5 and 6 are then placed to pivot at the center points. The arms are similar to those shown in, and described with reference to, Fig. 5.

Figure 2:
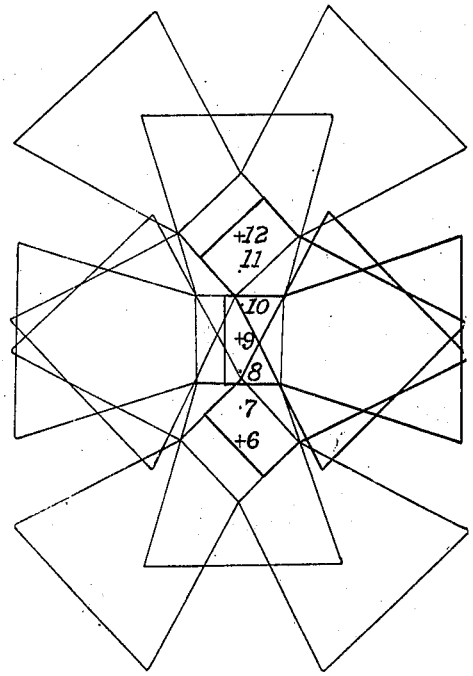
Fig. 2 shows diagrammatically three five-lens aerial photographs which are suitably overlapped for employment in this process with either a two-arm or a three-arm plotting machine.

In Fig. 2 the three five-lens photographs outlined have their centers at the small crosses, 6, 9 and 12, and they are of a series such as would be taken in practice by alternately skewing the camera 45 degrees and squaring it to the flight course. The centers of intermediate photographs are indicated by dots and intervening numbers but their outlines are not shown. Parts of the three photographs which would be employed together are shown by heavy lines at the right side of the figure, the balance of each photograph being outline by light lines. Another set of parts of the three outlined photographs, which can be similarly employed, is at the left side of the figure. All three of the parts or any two of them can be employed with the plotting machine.

Figure 3:
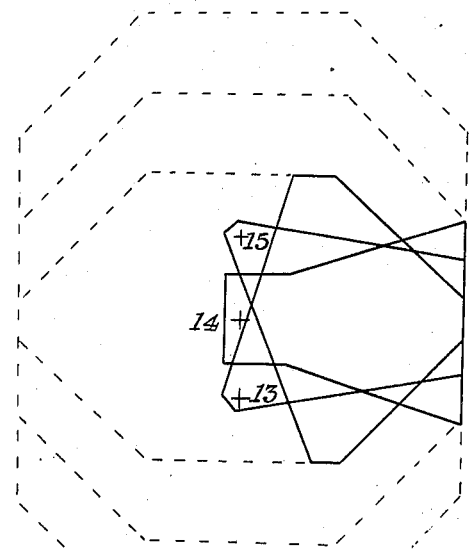
Fig. 3 shows diagrammatically three nine-lens aerial photographs which are suitably overlapped for employment in this process with either a two-arm or a three-arm plotting machine.

In Fig. 3 the centers of the three photographs are indicated by crosses and the numbers 13, 14 and 15. Parts of the three photographs which would be employed together as a set are shown by heavy lines, the balance of each photograph being outlined by broken lines. It is evident that other parts covering common terrain likewise could be employed together by threes or by pairs.

Figure 4:
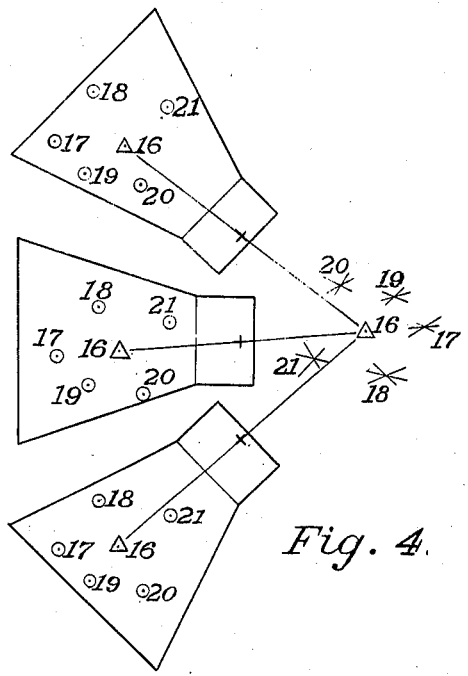
Fig. 4 shows diagrammatically parts of three five-lens aerial photographs and a straight line extending from the image of an object to each center and prolonged to meet at the position of the object on a plotting sheet. It also shows short lines intersecting at the positions of the five other numbered objects.

In Fig. 4 the three parts, which are placed and oriented with respect to one another as they would be for plotting, correspond to the heavily outlined parts of photographs 6, 9 and 12 of Fig. 2. To set them up properly for plotting it is necessary to have already plotted on the sheet the positions of their centers and the position of at least one other control point, such as 16, whose image appears in each part sufficiently distant from each center to afford a line of suitable length for orientation. Other points such as 17 to 21 may then be located at the intersections of the straight lines extending from their images through the respective centers of the photographs.

In Fig. 5 the map sheet on which a map is to be drawn rests on a flat table or drafting board. It is the field on which the photographs and plotting machine rest. On it there have been plotted the positions of the center points of the two photographs and a control point common to both photographs. All three of these points are covered by the plotting machine, the control point which is common to both photographs being at the foot of the pencil and a center point at each arm pivot. By these three control points the two photographs 22 and 23 have been placed and oriented exactly 180 degrees from their true orientation. Resting on top of the photographs are the two arms of the plotting machine, 24 the left, and 25 the right, arm. Each of these two arms is held in place and pivoted to swing over its respective photograph about one of the center points. The pivot bar 26 of the left arm is similar to the pivot bar 27 of the right arm except that its projecting round peg 28 is a little shorter than the projecting round peg 29 of the right pivot bar and its footing 30 a little thinner than the footing 31 of the right pivot bar. Removable weights 32 hold the pivot bars firmly in position. Each arm 24 and 25 is made up of wood or other suitable material and a transparent material such as celluloid or glass and is stiff enough to prevent flexure when doing its work. Each arm consists of a beam at the end nearest the operator long enough to extend entirely across the photograph, a slotted beam at its opposite end long enough to reach across the part of the map to be drawn from a pair of photographs and a cylindrically shaped pivot recess at its middle. The beam over the photograph has a base of transparent celluloid or transparent glass, the lower surface of which bears a well-defined longitudinal straight line 33 which prolonged passes through the center of the pivot recess. The base is joined securely to the upper part 34 which serves both to stiffen the beam and to connect it rigidly to the other parts of the arm. The slotted beam 35 of each arm serves to move properly a pencil carriage over the map sheet as the arms are moved. It is made of wood or other suitably stiff material and is slotted throughout most of its length, the slot being carefully made of uniform width. The center line of the slot prolonged passes through the center of the pivot recess and lies in the same vertical plane with the line 33. The two arms are similar in general but differ in that the slotted beam of the left arm has a single deck while the slotted beam of the right arm has two decks, which are separated just enough to allow the left arm to go between them without binding. Both decks of the right arm are slotted so that the slot of the upper deck stands directly over the slot of the lower deck.

To facilitate use of the plotting machine and to enable an operator to work rapidly, a specially rigged adjustable stereoscope of mirrors, magnifying glasses and electric lamps is used. It is mounted on bases 37 having rollers which rest on platforms 38, which are also equipped with rollers to rest on the drafting table. The rollers of the bases are all parallel to one another and permit movement of the entire stereoscope in one direction forward and back. The rollers of the platform are placed to give a movement to the stereoscope at right angles to the line of movement offered by the rollers of the bases. The two sets of rollers provide for moving the stereoscope without changing its orientation and to obtain proper vision of the photographs. The range of movements of the stereoscope is sufficient for an observer to examine a large pair of overlapping photographs at one setting of the instrument.

In Fig. 6 a method of joining the two beams together to form a left arm is shown. The thin transparent piece of celluloid, or glass, 39 is screwed, glued or otherwise securely fastened to the stiffener 34 and the two beams joined with a lap joint by rivets or screws and glue. The pivot recess 40 passes through the joint. The piece of transparent material is at the lower surface of the arm and rests directly on the photograph. The slotted beam 35 is raised enough to permit it to rest on the lower deck of the right arm. The upper and lower surfaces of the arm are flat and smooth and parallel to each other.

In Fig. 7 the relationship between the scribed line 33, the pivot recess, 40, and the slot of the beam 35 of the left arm is shown. A vertical plane through the center of the pivot recess includes both the scribed line and the center line of the slot. The pivot recess 40 is widened at its top to permit easy centering in placing the arm in position for work.

In Fig. 8 the two decks of the slotted beam of the right arm are shown. The lower deck 41 has the same thickness as the beam 34 of the left arm and the space between the lower deck 41 and the upper deck 42 is slightly more than the thickness of the slotted beam 35 of the left arm. The two decks are held apart by fillers 43 in the joint and at the opposite end of the beam. The upper and lower surfaces of the arm are flat and smooth and parallel to one another.

In Fig. 9 the two decks of the slotted beam 35, of the right arm, are shown lined up vertically so that a slot from top to bottom of the beam is formed. In other particulars the right arm is similar to the left arm.

In Fig. 10 the left pivot bar 26 is shown with its footings 30 and its round pivot peg 28. The bar 26 is made of wood or any suitable stiff material and is wide enough to anchor the round pivot peg which may be made of hard wood. The bar is made long enough to support a weight on each side of the pivot peg to hold the bar firmly in place. The footings 30 are of a thickness slightly greater than the thickness of the left arm at its pivot recess.

In Fig. 11 the shape of the footing 30 to permit wide swing of the arms is shown.

In Fig. 12 there is shown a method by which the arms of the plotting machine, which are indicated by dotted lines, engage and carry the pencil carriage. The carriage consists of a metal tube 44 mounted on a base 45 preferably of hard wood. The tube 44 projects below the base far enough to be engaged by the slotted beams of both arms of the plotting machine but not far enough to touch the map sheet. It has a shoulder which bears against the base of the carriage to prevent contact with the map sheet and its inside diameter and length are proper to receive without binding and to hold erect a pencil with its point in contact with the map sheet. The lower part of the tube is of the proper diameter to permit the arms of the plotting machine to engage it without binding and without un-wanted play. The base has a hole drilled through its mid part just large enough to insert the tube and give a pressed fit. The base is broad enough to rest evenly on the upper deck of the right arm of the plotting machine. A circular weight 46 in the form of a washer rests on the base to hold it in ballast.

Fig. 13 shows in section an assembly of the pencil carriage and weight together with the pencil 47, its washer-like weights 48 and a stop 49 for the pencil weights. The arms of the plotting machine are represented by dotted lines. A common drafting pencil sharpened with a cone forming sharpener is employed. The tube 44 is reamed to the required diameter. A rubber band is used for the stop 49. It may be pushed higher on the pencil as the pencil becomes shorter from repeated sharpening.

Parts of five-lens photographs such as shown in Fig. 14 will require that their center points be added to them. This can be done conveniently by attaching a small piece of transparent paper or celluloid securely to the under surface of the photograph so that it will extend far enough to embrace the center point. The center point itself can then be marked in its true position by reference to the mid-section of the entire photograph. With both photographs so prepared, placing and orienting them is accomplished by bringing each center point 50, 51 directly over its respective plotted position on the map sheet and swinging the photographs each about its center point until 50, 52 (M) and 52 of the left photograph are in line and similarly 51, 52 (M) and 52 on the right photograph are also in line. The point surrounded by a triangle and labelled 52 (M) is the plotted position on the map sheet of the control point 52, which is also surrounded by a triangle where it appears in each photograph. The center points 50 and 51 of the photographs coincide with their respective positions as plotted on the map sheet. Points labelled 53 (M), 54 (M), 55 (M), and 56 (M) are shown in their true position on the map sheet as they would be plotted by the process. All of these appear on both photographs and are labelled thereon 53, 54, 55, and 56 respectively. Outlines of the two photographs in their true relative positions are indicated by broken lines. In the positions shown by full lines they have been rotated 180 degrees about their respective center points, where they are properly placed for employment in the process. The numeral 57 marks the same corner of the left photograph in its two positions and 58 marks a corner of the right photograph in its two positions. That part of Fig. 14 so far explained shows a set-up for the scale of the map at approximately the scale of the photographs. To explain how the scale of the map may be varied, the same two photographs are also shown by dotted outlines in position for making a map at a scale about three times as large as the approximate scale of the photographs. For this set-up 52 (M) remains where it was for the first set-up, but the center points 50 and 51 have been shifted in position much farther from 52 (M) and the greater triangle they now form with 52 (M) is similar to the triangle they first formed with that control point. The scale of the map to be made depends directly on the scale at which the point 52 (M) and the center points 50 and 51 are originally plotted on the map sheet. For the plotting at the larger scale the points labelled 53 (M), 54 (M), 55 (M), and 56 (M) will be found at (53), (54), (55), and (56) respectively, at the intersection of the straight lines drawn from the images through the center point of each photograph.

In Fig. 4 parts of three overlapping five-lens aerial photographs have been set up on a plotting sheet as they would be arranged for use with a three-arm plotting machine constituted in the same general fashion as the two-arm machine shown in Fig. 5, except that the slotted bar of each arm would be single-decked. The positions of the central points must be known and plotted as well as a control point some distance from the center to orient each photograph, as explained, with reference to Fig. 14. In those cases where more than two plotting arms are employed the stereoscope is not used but the plottings are made by point to point settings. Multiple-arm plotting while not as rapid affords somewhat more assurance of accuracy than plotting with a two-arm machine.

The process permits a wide latitude in selection of scale for the map and the stereoscope provides for rapid operation of the plotting machine. By making the slotted beams of the arms thick enough satisfactory performance of the plotting machine is attained with a single-deck for each arm.

I claim:

1. An aerial photograph map plotting machine having two or more pivoted arms, each of the said arms having a straight line scribed on a transparent material, the said straight line prolonged passing through the center of the pivot, and a longitudinal slot on the opposite side of the pivot, the said scribed line and the center line of the said longitudinal slot being in a common vertical plane, and a travelling pencil carriage which holds a pencil erect and in contact with a map sheet, the said pencil carriage being engaged and held erect in the said longitudinal slots and moved about over the map sheet by the arms of the said plotting machine.

2. In a process of making maps with aerial photographs the placing on and in contact with a map sheet of two or more photographs of the same terrain but taken from different aerial stations, each of the said photographs being rotated, in the plane of the map sheet, 180 degrees from the righted position, about the photographic center point superimposed on its corresponding true plotted position, leaving uncovered that part of the map immediately to be drawn, and locating the photographed objects and features directly on the said map sheet in their proper positions by straight lines extending from the images of the said objects or features through pivots at the said center points of the photographs and prolonged to intersect, the map being at any desired scale.

3. In a device for making maps from two photographs of the same terrain but taken from different aerial stations, each of the two photographs being rotated, in the plane of the map sheet, 180 degrees from its righted position, about a center point superimposed on its corresponding true plotted position, leaving uncovered that part of the map to be immediately drawn, objects and features pictured being drawn in their proper positions directly on the map sheet with a plotting machine having an arm pivoted at the said center point of each photograph, each of the said arms having a straight guiding line which prolonged passes through the center of its respective pivot, and on the opposite side of the pivot a straight guiding bar which is aligned parallel to the said straight guiding line, and a travelling pencil carriage which continually holds a pencil in contact with the map sheet and on the prolongation of the said straight guiding line, the pencil carriage being engaged and moved about over the map sheet by the said straight guiding bars in combination with an adjustable magnifying stereoscope capable of being moved on rollers in two right-angle directions without changing its orientation, the arms of the plotting machine being moved by hand, unison of movement being maintained by continuous observation through the stereoscope so that the said straight guiding lines are made always to cut corresponding points of the images of objects or features being plotted.

4. An aerial photograph map plotting machine having two or more intersecting arms, each of the said arms having a pivot near its middle permitting the arm to be swung easily on a flat surface, each of the said arms also having a straight guiding edge which prolonged passes through the center of the pivot, and a straight guiding bar on the opposite side of the pivot, the said guiding bar being in alignment with the guiding edge of its arm, and a travelling pencil carriage engaging each guiding bar which continually holds a pencil in contact with a map sheet and on the prolongation of each guiding edge, the said pencil carriage being engaged and moved about over the map sheet by the said guiding bars.

5. In a process of making maps with aerial photographs the placing on and in contact with a map sheet of two or more photographs of the same terrain but taken from different aerial stations, each of the said photographs being rotated, in the plane of the map sheet, 180 degrees from the righted position, about a definite point lying close to the photographic center point superimposed on its corresponding true plotted position, leaving uncovered that part of the map immediately to be drawn, and locating the photographed objects and features directly on the said map sheet in their proper positions by straight lines extending from the images of the said objects or features through pivots at the said centrally located definite points and prolonged to intersect, the map being at any desired scale.

6. In a process of making maps with aerial photographs the placing on and in contact with a map sheet of two or more photographs of the same terrain but taken from different aerial stations, each of the said photographs being rotated, in the plane of the map sheet, 180 degrees from the righted position, about the vertical point of the photograph superimposed on its corresponding true plotted position, leaving uncovered that part of the map immediately to be drawn, and locating the photographed objects and features directly on the said map sheet in their proper positions by straight lines extending from the images of the said objects or features through pivots at the said vertical points and prolonged to intersect, the map being at any desired scale.

7. In a process of making maps with aerial photographs the placing on and in contact with a map sheet of two or more photographs of the same terrain but taken from different aerial stations, each of the said photographs being rotated, in the plane of the map sheet, 180 degrees from the righted position, about the center of distortion of the photograph superimposed on its corresponding true plotted position, leaving uncovered that part of the map immediately to be drawn, and locating the photographed objects and features directly on the said map sheet in their proper positions by straight lines extending from the images of the said objects or features through pivots at the said centers of distortion and prolonged to intersect, the map being at any desired scale.

JAMES WARREN BAGLEY.